United States Patent [19]  [11] 4,095,016
Carrock et al.  [45] June 13, 1978

[54] PROCESS FOR THE POLYMERIZATION OF α-OLEFINS

[75] Inventors: Frederick Elias Carrock, Paramus; Peter James Perron, Pompton Plains; Edward August Zukowski, Clark, all of N.J.

[73] Assignee: Dart Industries, Inc., Los Angeles, Calif.

[21] Appl. No.: 750,751

[22] Filed: Dec. 15, 1976

[51] Int. Cl.$^2$ .......................... C08F 4/66; C08F 10/06
[52] U.S. Cl. ................................ 526/137; 252/429 B; 526/139; 526/348; 526/351
[58] Field of Search ................................ 526/137, 139

[56] References Cited

U.S. PATENT DOCUMENTS

| | | | |
|---|---|---|---|
| 3,639,375 | 2/1972 | Slaiger et al. | 526/139 |
| 3,644,320 | 2/1972 | Sugiura et al. | 526/139 |
| 3,736,307 | 5/1973 | Perry | 526/348 |
| 3,752,797 | 8/1973 | Gordon et al. | 526/139 |
| 3,926,928 | 12/1975 | Karayannis et al. | 526/139 |
| 3,940,345 | 2/1976 | Count | 526/139 |

FOREIGN PATENT DOCUMENTS 2,407,095  9/1974  Germany.

Primary Examiner—Edward J. Smith
Attorney, Agent, or Firm—Margareta Le Maire; Bryant W. Brennan; Fred S. Valles

[57] ABSTRACT

A catalyst system comprising (1) a cocrystallized titanium trichloride-aluminum chloride modified with phosphorus oxytrichloride, (2) an organo aluminum compound, and (3) an organic trithiophosphite or trithiophosphate for the production of polymers in high yields and of reduced amorphous polymer content.

8 Claims, No Drawings

PROCESS FOR THE POLYMERIZATION OF α-OLEFINS

BACKGROUND OF THE INVENTION

In the polymerization of $C_2$ to $C_8$ α-olefins such as ethylene, propylene, butene-1, etc. and mixtures thereof, the conventional catalyst system is a titanium chloride catalyst activated with an organo aluminum compound, e.g. a cocrystallized titanium chloride-aluminum chloride catalyst of the general formula n·$TiCl_3·AlCl_3$ activated with diethyl aluminum chloride or triethyl aluminum. It is a well known fact, that any measures taken to increase the efficiency (productivity) of the catalyst system, e.g. by raising polymerization temperature, is generally accompanied by an undesired increase in amorphous content of the polymer, as evidenced by a decrease in polymer heptane insolubles content, hereinafter called HI content.

There are limits however to the temperatures that can be used in polymerization reactions carried out in the liquid phase. These, by necessity, include process steps where the polymer product is separated from the liquid diluent, be it either an inert solvent or liquefied monomer. In these separation steps are used various pieces of equipment including conduits, filters, etc., which will plug if this polymer becomes tacky due to high amorphous polymer content. It has been found that in order to assure trouble-free operations the HI content of the polymer product from the reactor should roughly be about 80% or more, however, the actual minimum value most probably varies from one installation to another.

It is evident from the above that for any specific polymerization system there is an optimum reaction temperature or temperature range that will result in a product of acceptable quality and yield. Lower than optimum conditions would result in less than acceptable productivity, and at higher temperatures than the optimum, the increased productivity would be more than offset by the accompanying deterioration of product quality. It should be understood, that often there are many other considerations in addition to operability of this equipment that are taken into account when determining the optimum conditions, e.g. costs of raw materials and utilities costs of disposal of amorphous by-products, desired physical properties of the finished product, etc. In other words, the optimum conditions are not necessarily those where the reaction system has reached its operational limit.

In the commercial production of highly crystalline polymers, such as propylene homopolymer, using the conventional catalyst, the optimum temperature range is typically from about 140° to 160° F, generally resulting in HI values between about 89 to about 93 measured on undeashed polymer product. However in the production of many other polymers of less crystallinity much lower temperatures, e.g. 140° F and below, must be used or severe operational problems are experienced. In fact, attempts to commercialize processes for the production of some polymers, such as polybutene-1, various random copolymers of propylene and another comonomer such as ethylene, have either been very disappointing or completely unsuccessful, since due to the inherent lesser crystallinity of these polymers the polymerization temperatures must be maintained at such low levels that the productivities are unacceptable.

Recently several new olefin polymerization catalyst systems of increased efficiency and/or increased stereo specificity have been reported in the art. U.S. Pat. No. 3,644,320 discloses one such catalyst system, which consists of a trithiophosphate or a trithiophosphite added to a conventional titanium chloride-organo aluminum catalyst composition in amounts to provide a mole ratio of the additive to the organo aluminum component of at least 0.005. In small scale batch polymerizations of propylene it was shown that products could be obtained in higher yields and having higher heptane-insoluble contents when using the three component catalyst system instead of the conventional two component system.

During the preliminary small scale batch experimentation leading up to the present invention, the beneficial effects of including trithiophosphite in the catalyst system on polymer quality and catalyst efficiency were indeed verified. However, under continuous polymerization conditions, i.e. where monomer feed and catalyst components are fed continuously to the reactor and product is withdrawn in a continuous or "pseudo" continuous fashion, it was quite surprisingly found that the expected increase in catalyst efficiency did not materialize, in fact, the efficiency was generally somewhat lower than that of a conventional catalyst and did not improve by an increase in the trithiophosphite content. The following Table 1 sets are typical values of relative catalyst efficiencies obtained in various comparative, continuous propylene polymerization tests in the presence of a three-component catalyst system containing 3·$TiCl_3·AlCl_3$, diethylaluminum chloride and trilauryl trithiophosphite. The catalyst efficiency of the conventional catalyst has been arbitrarily set at 100%.

TABLE 1

| Effect of Trialaurylphosphite on Catalyst Efficiency | | |
|---|---|---|
| Thiophosphite[1] Rate-ppm | Thiophosphite Organoaluminum Mole Ratio | Efficiency % |
| 0 | 0 | 100 |
| 50–100 | 0.01–0.02 | ~85–95 |
| 280 | 0.06 | ~75–85 |

[1] Based on propylene monomer feed rate

Although not wishing to be bound by any theory for an explanation of the surprising absence of any improvement in catalyst efficiency, when using the three-component catalyst system of the aforementioned patent in a continuous polymerization process, the fact still remains that the catalyst is not suitable in many commercial applications, where increase in polymer quality as well as catalyst efficiency is a requirement.

Another newly developed olefin polymerization catalyst composition having increased efficiency and stereo-specificity is disclosed in Belgian Pat. No. 818,474. Briefly described, the catalyst composition is a two-component system wherein one of the components is a titanium trichloride, preferably as cocrystallized 3·$TiCl_3·AlCl_3$, which has been modified by treatment with phosphorus oxytrichloride in the presence of a aromatic hydrocarbon. The other component is a conventional organo aluminum compound.

In small scale batch propylene polymerization tests, the reported improvements in yield and polymer quality (i.e. heptane insolubles content) obtained with this new catalyst were verified. However, further evaluation in relatively large scale continuous polymerization tests showed that although the polymer heptane insoluble contents did improve, the efficiency of the catalyst at reactor temperatures of about 140° F and below was at best no better, and in most cases lower, than that of conventional unmodified catalyst. Although, an additional advantage of the modified catalyst composition is the retention of higher polymer heptane insoluble contents when conducting the polymerization at higher temperatures to increase polymer yield, the commercial use of this catalyst composition is still somewhat limited, in that many polymers, e.g. random copolymers of ethylene and propylene containing about 3 weight percent or more polymerized ethylene, cannot be produced therewith at the required levels of polymer heptane insolubles to assure trouble-free operations.

It is therefore an object of the present invention to provide an improved olefin polymerization catalyst composition.

Another object of the invention is to provide a catalyst composition for the continuous production of α-olefin polymers of high heptane insolubles content at improved rates.

Other objects will become apparent from a reading of the specification and appended claims.

THE INVENTION

In accordance with the present invention there is provided a catalyst composition for the continuous polymerization of at least one α-olefin having from 2 to 8 carbon atoms per molecule, which comprises:

(1) a modified titanium trichloride component obtained in a process comprising heating phosphorus oxytrichloride with titanium trichloride in the presence of an aromatic hydrocarbon diluent:

(2) an organo aluminum compound selected from aluminum trialkyls or dialkyl aluminum halides or mixtures thereof in amounts from about 1.5 moles to about 150:1 moles per mole of titanium chloride: and (3) at least about 30 ppm, of a compound selected from $(RS)_3P$ and $(RS)_3PO$ where R is a hydrocarbon radical of up to 20 carbon atoms based on the monomer feed rate to the polymerization.

The modified titanium trichloride component is preferably derived from a cocrystallized titanium trichloride·aluminum chloride composition of the formula $n \cdot TiCl_3 \cdot AlCl_3$ where $n$ is a value of from about 1 to about 5. The most preferred starting composition is such a cocrystallized species where $n$ is about 3. Prior to the modification, the titanium chloride composition is activated in the usual manner, e.g. by ball milling.

The modification is carried out by treating the activated material with phosphorus oxytrichloride in amounts such that the mole ratio of titanium to phosphorus is in the range from about 2:1 to about 20:1 or even higher, and preferably between about 3:1 and about 10:1. The reaction is carried out in liquid phase using an aromatic solvent, e.g. benzene or toluene, as the diluent. Since moderately elevated temperatures promotes the reaction, the mixture is usually maintained at a temperature in the range of about 60° C to about 80° C for a few hours. Adequate contact of the reactants is obtained either by the boiling action of the solvent or by mechanical agitation. After conclusion of the reaction, the solids are separated from the diluent and dissolved reaction by-products and usually thereafter washed with an organic solvent. After drying, the solids can be further activated, if so desired. The modified catalyst component is added to the polymerization zone at a rate of about 0.02 to about 0.3 percent by weight of the total monomer feed rate.

The second component of the catalyst composition of this invention can be a trialkyl aluminum, a dialkyl aluminum halide or mixtures thereof, wherein the alkyl groups should contain no more than 8 carbon atoms. The most preferred of all these well known compounds are triethyl aluminum and diethyl aluminum chloride. Although the mole ratio of the organo aluminum compound to titanium trichloride can be broadly maintained between about 1.5:1 and 150:1, it is preferred to limit the ratio to values in the range from about 1.9:1 to 4:1. The organo aluminum compound should be added separate from the modified titanium trichloride catalyst component, in order to prevent premature activation of the catalyst causing plugging of the catalyst nozzle in the reactor.

The third component of the catalyst composition is a trithiophosphite or trithiophosphate of the respective general structures $(RS)_3P$ and $(RS_3)PO$ wherein R is a hydrocarbon group of not more than 20 carbon atoms. The hydrocarbon group is suitably selected from $C_1$–$C_{20}$ alkyl groups, $C_6$–$C_{12}$ aryl groups and $C_7$–$C_{20}$ alkaryl groups. One particularly advantageous compound to be used in this invention is trilauryl trithiophosphite, and can be obtained in high purity grade. For best results, however, it should be dried, e.g. with molecular sieves, prior to use. At least 30 ppm of trithiophosphite or trithiophosphate based on the monomer feed rate should be provided to the polymerization zone and preferably in quantities from about 40 to about 150 ppm. No advantage of employing rates in excess of the upper preferred limit is discernible. The trithiophosphite or trithiophosphate may be added directly to the reaction zone in any suitable manner, e.g. by injecting it at the desired rate into a monomer recycle stream. The alleged improvements obtained by aging the organo aluminum compound with the trithiophosphite or trithiophosphate in accordance with the disclosure of U.S. Pat. No. 3,644,320 has not been observed in large scale continuous operations, and is therefore an unnecessary step in the process of this invention.

The three-component catalyst composition is useful in any continuous liquid phase olefin polymerization reactions. Of particular interest is the well known "liquid pool" process, wherein liquid monomer, e.g. propylene, functions as a liquid diluent as well as feed to the reaction. Optionally, a comonomer, such as ethylene, butene-1, pentene-1, 3-methyl butene-1,4-methyl pentene-1, etc. is added to the reactor. The reactor conditions include temperatures generally between about 50° and about 190° F, preferably between 125° F and 175° F. The pressure should be sufficiently elevated to maintain at least one of the monomers in liquid phase. Suitably, pressures of 150 psi and higher are used. Total solids in the reaction zone, in accordance with this system, are ordinarily in the order of from 15 to 50%, although obviously lower or higher, for example up to 60% polymer solids can be achieved. In order, however, to efficiently handle the slurry, it is preferred to keep the polymerization to the percent solids above indicated. The reaction is continuous and propylene and catalyst components are continuously withdrawn therefrom through a cyclic discharge valve which simulates continuous operation. If desired, various modifiers such as hydrogen may be added to alter the properties of the polymer product. Such modifiers are well known in the art and need not be discussed in any further detail since they form no part of this invention.

The withdrawn polymer slurry is let down in pressure to, for example, 50 psig or less in a low pressure zone (meaning a zone maintained at a pressure lower than that in the polymerization reaction) where due to the drop in pressure and the volatile nature of the polymerization ingredients, there is a flashing of these volatiles from the solid polymer. This flashing, which can be aided by heating, results in a polymer powder which is substantially dry and which by this term is to be understood to be a polymer containing 5% or less volatiles. The unreacted monomer stream is taken overhead from this low pressure flashing zone and at least a portion thereof is compressed and condensed and returned to the reactor. The polymer may be further reacted in a subsequent block polymerization zone, if so desired, or directly passed to a deashing zone to remove catalyst residues and low molecular weight amorphous polymer by techniques well known in the art. It was very unexpected to find that when the three-component catalyst system is employed in continuous polymerization operations, the catalyst efficiency is increased dramatically while simultaneously achieving higher polymer quality. A true synergistic effect is present, i.e. the catalyst efficiency obtained in the invention is far superior to those obtained with any other active combination of the catalyst components suggested by the prior art discussed before. Similarly, the amount of polymer heptane insolubles is considerably increased with the catalyst of the invention over those obtained with any of the aforementioned prior art catalyst compositions.

The catalyst composition of this invention is suitable for the continuous production of both homopolymers and copolymers of $\alpha$-olefins having from 2 to 8 carbon atoms per molecule. It is particularly suitable for the production of such polymers, which are known to have generally lower heptane insolubles content, such as, random copolymers of propylene and another comonomer such as ethylene, butene-1, etc., or homopolymers of butene-1, pentene-1 etc.

The following examples illustrate the advantages obtained with this invention. The experiments were conducted in large scale continuous pilot plant operations, wherein propylene monomer and catalyst components were continuously charged to a stirred reactor at rates corresponding to 2 hours residence times in the reactor. The titanium trichloride catalyst component was either an activated $3 \cdot TiCl_3 \cdot AlCl_3$ catalyst (AA), or such a catalyst previously modified by reaction in benzene with phosphorus oxytrichloride at a titanium/phosphorus mole ratio of 4:1 (M). Homopolymerizations of propylene were conducted at 155° F and 440 psig, while the experiment pertaining to production of ethylene-propylene copolymers were made at 130° F and 360 psig. Diethylaluminum chloride was used as the organo aluminum component and added to provide a mole ratio of aluminum/titanium of about 3.0. The above two components were added at rates directly proportional to the polymer production rate and in amounts sufficient to maintain a polymer solids concentration in the reactor slurry at a nominal value of about 40%. The catalyst efficiency (lb polymer/lb $TiCl_3$ containing catalyst component) was calculated in each case from the polymer slurry withdrawal rate, solids content in the slurry and $TiCl_3$ component addition rate. The heptane insolubles content (%HI) was determined on each of the reactor products before deashing using standard Baily-Walker extraction method. Where trilauryl trithiophate (TLTTP) was used, it was added in amounts corresponding to about 50 parts per million based on the weight of the total monomer feed. In the production of random copolymers of ethylene and propylene containing 2.5% and 4% by weight polymerized ethylene, the feed contained about 1 wt% and 1.5 wt% ethylene respectively.

EXAMPLES 1-4

The following comparative runs demonstrate the synergistic improvements which are achieved with the catalyst composition of this invention in the homopolymerization of propylene in accordance with the procedure set forth above. The pertinent data are summarized in Table 2.

TABLE 2

| | Homopolymerization of Propylene | | | |
|---|---|---|---|---|
| Example | $TiCl_3$ Component | TLTTP ppm | Productivity lb/lb | HI % |
| Control 1 | AA | 0 | 1276 | 94.6 |
| Control 2 | M | 0 | 1480 | 96.2 |
| Control 3 | AA | 50 | 1205 | 96.3 |
| Ex 4 | M | 50 | 1736 | 97.6 |

As seen from Controls 1 and 2, the M catalyst is better than conventional AA catalyst with respect to productivity as well as polymer quality. Comparisons of the results of Control 1 and 3 shown that addition of TLTTP to the conventional AA catalyst system results in an improvement in %HI but a detrimental decrease in productivity. However, addition of TLTTP to the conventional M catalyst system resulted in a dramatic and unexpected increase in productivity as well as in increased HI content.

EXAMPLES 5-9

The beneficial synergistic effects of the catalyst system of the invention in random copolymerization of ethylene and propylene to produce polymers containing 2.5 and 4.0 wt% are shown by the data of Table 3. The experiments were carried out as described previously.

TABLE 3

| | Copolymerization of Ethylene and Propylene | | | | |
|---|---|---|---|---|---|
| Example | $TiCl_3$ Component | TLTTP | % Polymer Ethylene | Productivity lb/lb | HI% |
| Control 5 | AA | 0 | 2.5 | 835 | 85.4 |
| Control 6 | M | 0 | 2.5 | 796 | 86.1 |
| Control 7 | AA | 50 | 4.0 | 533 | 78.9 |
| Control 8 | M | 0 | 4.0 | 664 | 78.6 |
| Ex 9 | M | 50 | 4.0 | 1038 | 84.6 |

Controls 5 and 6 show that the performance of the prior art catalyst systems AA and M are substantially the same at relatively low polymerization temperatures (130° F). Increasing the polymerized ethylene content from 2.5% to 4% resulted in reduction in both productivities as well as in HI contents when using either AA catalyst with TLTTP or M catalyst in the absence of TLTTP as shown by the results from Controls 7 and 8. These experiments both had to be discontinued after about 8 hours of operation due to severe plugging of the reactor outlet conduit with gummy polymer which prevented normal filtration of the polymer solids from the liquid and subsequent deashing. However, when TLTTP was added to the M catalyst system immediate improvements in both productivity and in reactor performance were noted. The product lost its tackiness and became grainy resembling propylene homopolymer. The polymer, which had an HI content of 84.6% could be transferred, separated and deashed without any difficulty.

It is obvious to those skilled in the art that many variations and modifications can be made to the process of this invention. All such departures from the foregoing specification are considered within the scope of this invention as defined by the specification and the appended claims.

What is claimed is:

1. In a process for the continuous polymerization of at least one α-olefin monomer having from 2 to 8 carbon atoms per molecule wherein monomer feed and catalyst components are fed continuously to the reactor and product is withdrawn in a substantially continuous fashion as a slurry in liquid monomer, said slurry having a solids content between about 15 and about 50 percent by weight, the improvement which comprises: polymerizing the α-olefin monomer at a temperature between about 125° F and about 175° F and at a pressure of at least 150 psi and sufficient to maintain monomer in the liquid phase in the presence of a catalyst system comprising:

(1) between about 0.02 and about 0.3 percent by weight based on the α-olefin monomer feed rate of a modified titanium trichloride component obtained by agitating in the presence of a liquid aromatic hydrocarbon diluent at a temperature of from about 140° F to about 176° F a titanium trichloride of the formula n·TiCl$_3$·AlCl$_3$, where n has a value between about 1 and about 5, with sufficient phosphorus oxitrichloride to provide a titanium to phosphorus mole ratio of about 3:1 to about 10:1 in the modified component, separating said component from the diluent and drying said component;

(2) an organoaluminum compound selected from aluminum trialkyls or dialkyl aluminum halides or mixtures thereof in amounts from about 1.9 moles to about 4 moles per mole of titanium chloride, and (3) between about 40 and about 150 ppm by weight based on the α-olefin monomer feed rate of a trialkyltrithiophosphite, wherein each of the alkyl groups contain from 1 to 20 carbon atoms.

2. The process of claim 1, wherein n has a value of about 3.

3. The process of claim 1, wherein the dialkyl aluminum halide is a dialkyl aluminum chloride.

4. The process of claim 1, wherein the alkyl groups of the trialkyl aluminum or dialkyl aluminum halide contain 8 carbon atoms or less.

5. The process of claim 4, wherein the alkyl group is an ethyl group.

6. The process of claim 1, wherein the trithiophosphite is trilauryl trithiophosphite.

7. A process according to claim 1, wherein at least one of the α-olefins is propylene.

8. A process according to claim 7, wherein the α-olefin is a mixture of ethylene and propylene.

* * * * *